---

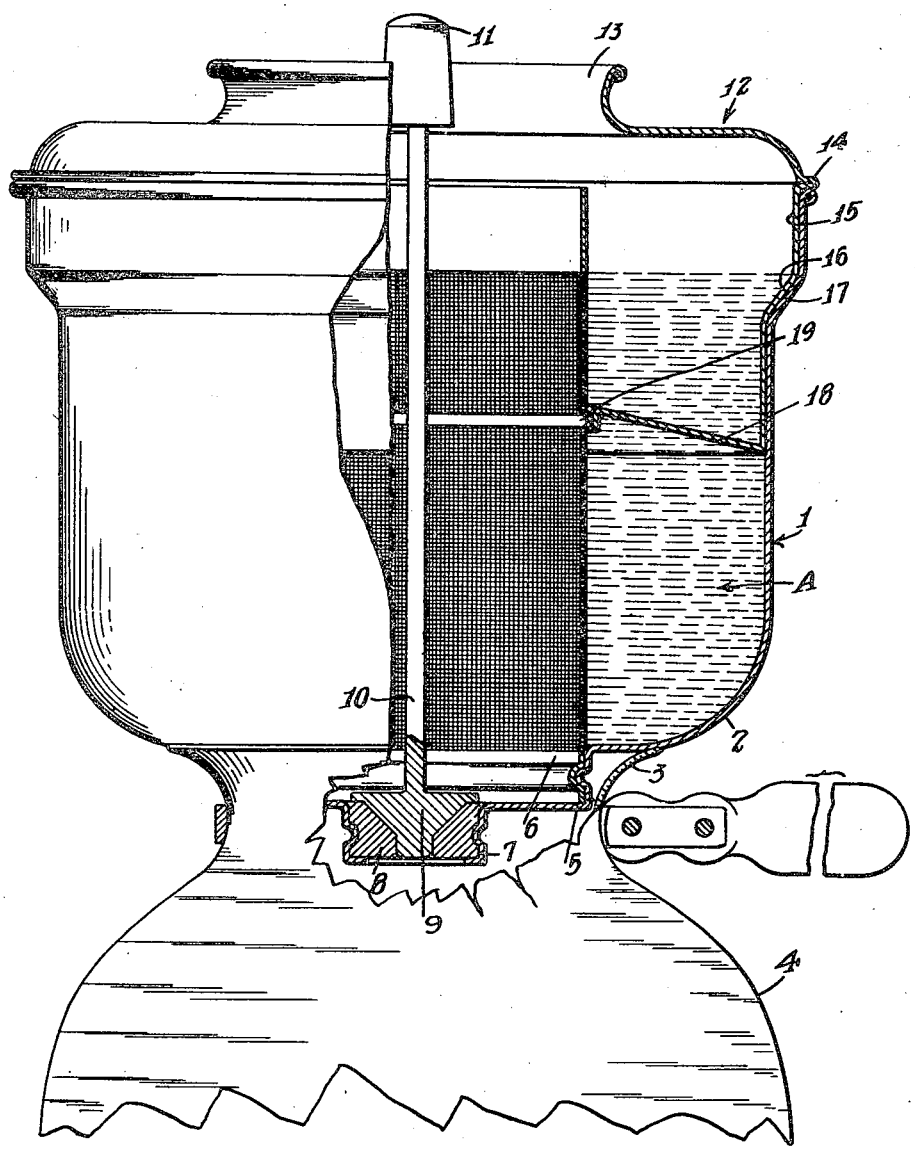

UNITED STATES PATENT OFFICE 2,436,784

COFFEE BREWING APPARATUS

Richard E. Ballerino, Los Angeles, and Robert F. Ashdown, Montebello, Calif., assignors to Farmer Bros. Coffee Co., Los Angeles, Calif., a corporation of California Application August 7, 1944, Serial No. 548,432

8 Claims. (Cl. 99—299)

Our invention relates to coffee brewing apparatus and among the objects of our invention are:

First, to provide an apparatus for the brewing of coffee which minimizes oxidation of the aromatic coffee oils by maintaining the coffee grains completely covered by water during the entire brewing operation to avoid air contact and by use of boiled water free of gaseous oxygen.

Second, to provide an apparatus of this character which insures complete extraction of the coffee oils, and which eliminates guess work so that a uniformly high quality brew may be made.

Third, to provide a coffee brewing apparatus which is simple and economical of manufacture, easily serviced and cleaned, and to provide a method of brewing coffee which may be carried out with a minimum of effort or attention.

With the above and other objects in view, reference is directed to the accompanying drawing, in which the figure is a fragmentary, partially sectional, partial elevational view of a coffee-making apparatus embodying our invention.

A cup-shaped container 1 is provided with a rounded bottom 2, adapted to seat upon the flanged mouth 3 of a suitable vessel 4. The container 1 is large enough to receive several cups of water.

The bottom of the container 1 is provided with a step 5 offset downwardly, forming a short cylindrical portion adapted to receive the lower end of a tubular screen 6 which extends to the top of the container 1. Within the step portion 5 is a second, or inner step 7, which is likewise offset downwardly and receives a valve seat ring 8 which forms a discharge opening for the container 1. A valve 9 fits in the valve seat 8. The upper side of the valve seat is preferably conical and the valve 9 is similarly formed. A stem 10 extends upwardly from the valve 9 to the top of the container 1 and is there provided with a handle 11 for the purpose of raising the valve clear of the valve seat.

A cover 12 closes the upper end of the container 1. The cover 12 is provided with a central opening 13 through which the handle 11 extends. The periphery of the cover is provided with a small flange 14 which is adapted to seat on the rim of the container 1. The cover 12 includes cylindrical side walls 15 which fit within the side walls of the container 1. The side walls 15 and the container are preferably provided with mating shoulder portions 16 and 17.

The lower extremities of the side walls 15 are inturned radially to form an annular base ring 18 which forms a partition between the side walls of the container 1 and the tubular screen 6. The radial inner edge of the base ring 18 is adapted to fit against an internal rib 19 formed in the screen 6.

The foregoing apparatus is employed in conjunction with our method of brewing coffee, as follows: The container 1 is placed on the vessel 4 with the valve 9 closing the opening in the valve seat 8. Coffee grains, ground to a size larger than the mesh of the screen 6, are placed in the annular space between the screen and the side walls of the container 1; the cover 12 is then placed on the container 1; the base ring 18 of the cover, together with the lower portion of the screen 6 and the container 1, forms an annular chamber A for the coffee grains. Water, preferably at boiling temperature and preferably water which has been boiled until the free oxygen is driven out, is poured into the container 1 through the opening in the cover 12. The opening in the cover 12 is approximately the same diameter as the screen 6 so that the water enters the annular compartment A through the screen 6. The container is filled to a point above the ring 18. After filling with water, the brew is allowed to stand until the coffee grains become heavier than the water and sink to the bottom of the annular chamber A.

It should be pointed out that initially the coffee grains are lighter than the water and tend to float upwardly against the base ring 18, but are prevented from floating to the top of the water by reason of this ring. When the grains have settled in the chamber A, the brewing period is concluded and the valve 9 is removed so that the contents may be discharged into the vessel 4.

The employment of the base ring 18 is of primary importance for the reason that the coffee grains are excluded from contact with air during the entire brewing period.

By reason of the fact that the partition or base ring 18 holds the coffee grains submerged during the entire brewing period, the loss of the aromatic oils which provide the coffee flavor is reduced to a minimum and as a consequence the flavor of the coffee prepared by the above described method and the use of our apparatus, produces coffee of superior flavor.

Many other embodiments of the invention may be resorted to without departing from the spirit of the invention.

We claim:

1. A coffee making apparatus comprising: a receptacle including a discharge opening in its lower end; valve means for said opening having a handle accessible from the upper end of said receptacle; a tubular screen surrounding said opening and extending to the upper end of said receptacle, said screen defining with said receptacle an annular coffee grain receiving chamber; a cover for said receptacle including side walls infitting within said receptacle and an inturned partition at the lower extremities of said side walls forming the upper end of said chamber to hold said coffee grains submerged when said receptacle is filled with water.

2. A coffee brewing device, comprising: a receptacle having bottom and side walls and a discharge opening in said bottom wall; manually operable valve means for said discharge opening; a partition member imperforate except for a central opening therein; and a hollow member surrounding said discharge opening and extending upwardly through said central opening in close proximity to said partition member, said hollow member being perforate below and to a point a substantial distance above said partition member, the arrangements being such that said partition member divides said receptacle into an upper and a lower chamber in communication through said hollow perforate member, said lower chamber being adapted for coffee grains and of such a capacity that said grains are loosely suspended therein, whereby free circulation of water relative to said coffee grains is permitted, and after brewing is completed said coffee grains will sink to the bottom of said lower chamber and leave a substantial portion of said hollow, perforate member in the zone of said chamber unobstructed, whereby to allow rapid draining of brewed liquid from said chamber.

3. A coffee brewing device, comprising: a receptacle having bottom and side walls and a discharge opening in said bottom wall; manually operable valve means for said discharge opening; a partition member imperforate except for a central opening therein; a hollow member surrounding said discharge opening and extending upwardly through said central opening in close proximity to said partition member, said hollow member being perforate below and to a point a substantial distance above said partition member; and means carried by said partition member and cooperable with said side wall of said receptacle for supporting said partition member a sufficient distance from said bottom wall to form an upper and a lower chamber both in communication with said hollow perforate member, said lower chamber being of sufficient capacity that coffee grains are loosely suspended therein when said receptacle is filled with water, whereby free circulation of water relative to said coffee grains is permitted, and after brewing is completed said coffee grains will sink to the bottom of said lower chamber and leave a substantial portion of said hollow, perforate member in the zone of said chamber unobstructed, whereby to allow rapid draining of the brewed liquid from said chamber.

4. A coffee brewing device, comprising: a receptacle having bottom and side walls and a discharge opening in said bottom wall; manually operable valve means for said discharge opening; a member insertable into said receptacle, said member including a generally vertical wall portion substantially conforming to the side wall of said receptacle and a generally horizontal partition imperforate except for a central opening and extending inwardly from said generally vertical wall portion and having a central opening therein; a hollow member surrounding said discharge opening and extending upwardly through said central opening in close proximity to said partition, said hollow member being perforate below and to a point a substantial distance above said partition; and means supporting said insertable member within said receptacle with said partition disposed at a sufficient height above the bottom wall of said receptacle to form an upper and a lower chamber both in communication with said hollow perforate member, said lower chamber being adapted for the retention of coffee grains and of such a capacity that said grains are loosely suspended therein, whereby free circulation of water relative to said coffee grains is permitted, and after brewing is completed said coffee grains will sink to the bottom of said chamber and leave a substantial portion of said hollow, perforate member in the zone of said chamber unobstructed, whereby to allow rapid draining of brewed liquid from said chamber.

5. A coffee brewing device, comprising: a receptacle having bottom and side walls and a discharge opening in said bottom wall; manually operable valve means for said discharge opening; an imperforate partition member supported by said side wall extending inwardly and slightly upwardly from said side wall and having a central opening therein, said partition member having a groove portion immediately surrounding said central opening; and a cylindrical screen having a beaded portion intermediate its ends surrounding said discharge opening and extending upwardly through said central opening, said beaded portion of said screen being received by the groove portion of said partition member, the lower portion of said screen, said partition member and said walls of said receptacle defining a chamber for the retention of coffee grains of such a capacity that said grains are loosely suspended therein, whereby free circulation of water relative to said coffee grains is permitted, and after brewing is completed said coffee grains will sink to the bottom of said chamber and leave a substantial portion of said screen in the zone of said chamber unobstructed, whereby to allow rapid draining of the brewed liquid from said chamber.

6. A coffee making apparatus, comprising: a receptacle having a discharge opening in its lower end; manually operable valve means for said discharge opening; a screen element surrounding said discharge opening; a cover for said receptacle; a partition member carried by said cover member, said screen element, said partition member, and a portion of said receptacle defining a coffee grain receiving chamber; and means providing for the access of water to said chamber.

7. A coffee brewing device, comprising: a receptacle having bottom and side walls, and a discharge opening in its bottom wall; valve means for said opening; a tubular screen surrounding said discharge opening and extending substantially to the top of said receptacle; and an annular imperforate removable partition adapted to encircle said screen intermediate its ends and separate said receptacle into upper and lower compartments in communication through the interior of said tubular screen; and means for suspending said partition below the level of liquid contained in said receptacle.

8. A coffee brewing device, comprising: a receptacle having bottom and side walls, and a discharge opening in its bottom wall; valve means for said opening; a tubular screen surrounding said discharge opening and extending substantially to the top of said receptacle; an annular imperforate partition located intermediate the ends of and surrounding said screen and below the normal liquid level of said receptacle to divide the receptacle into an upper and a lower compartment in communication through said tubular screen, and both compartments adapted to drain laterally into said tubular screen when said valve is opened, the lower compartment adapted to be partially filled with a brewing charge of coffee grains, whereby said coffee grains are freely suspended in the water and tend, when settled in said compartment, to provide a substantially clear path for the resultant coffee liquor when said valve is opened.

RICHARD E. BALLERINO.
ROBERT F. ASHDOWN.

REFERENCES CITED

The following references are of record in the file of this patent:

UNITED STATES PATENTS

| Number | Name | Date |
|---|---|---|
| 35,747 | Ernst | July 1, 1862 |
| 1,112,598 | Cook | Oct. 6, 1914 |
| 1,873,023 | Pierce | Aug. 23, 1932 |
| 2,047,134 | Coleman | July 7, 1936 |
| 2,230,031 | Fisher | Jan. 28, 1941 |
| 2,291,604 | Baselt | Aug. 4, 1942 |
| 2,314,543 | Kopf | Mar. 23, 1943 |

FOREIGN PATENTS

| Number | Country | Date |
|---|---|---|
| 39,934 | Germany | July 15, 1887 |